Dec. 30, 1952     P. M. SCHAEFER     2,623,925
VOLTAGE REGULATOR TESTER

Filed Jan. 21, 1949     3 Sheets-Sheet 1

INVENTOR.

Paul M. Schaefer

Dec. 30, 1952 P. M. SCHAEFER 2,623,925
VOLTAGE REGULATOR TESTER
Filed Jan. 21, 1949 3 Sheets—Sheet 2

INVENTOR.
Paul M. Schaefer

INVENTOR.
Paul M. Schaefer

Patented Dec. 30, 1952

2,623,925

UNITED STATES PATENT OFFICE 2,623,925

VOLTAGE REGULATOR TESTER

Paul M. Schaefer, Oak Ridge, Tenn.

Application January 21, 1949, Serial No. 71,957

5 Claims. (Cl. 175—183)

My invention relates to testing of voltage regulators, particularly automobile voltage regulators and it provides a tester especially suited to this service.

It is of great importance that automobile voltage regulators operate properly to regulate at their setting which is usually 7.5 volts. This is because, in modern automobiles, there are increasingly more electrically operated auxiliaries and accessories whose useful life depends on an accurately regulated voltage supply over a wide range of generator speeds. Some items, such as radio tubes are subject to being ruined by failure of the voltage regulator to function properly.

The object of this invention is to provide a tester able to provide a thorough and convincing test of the regulating ability or quality of the regulator in a quick and easy way.

Means commonly employed in the past to test voltage regulators have left a good deal to be desired. The test made ordinarily was not thorough; doubts remained in the mind of the service-man making the test; particularly, the methods and devices employed have involved an element of uncertainty which the present invention overcomes. Generally, these shortcomings of the prior art arose from the fact that the test depended on an unknown battery condition or the test was not complete enough to be conclusive.

Another object is to provide a method of testing an automobile voltage regulator comprising connecting a fixed resistor across the regulator while all normal loads are disconnected, checking the voltage drop across the resistor and then sequentially connecting parallel loads across said resistor and checking the voltage across the resistor each time and measuring the current increase as each load is connected.

Another object is to provide a voltage regulator testing instrument comprising a cabinet having a fixed resistor mounted therein with leads for connecting it across a voltage regulator output, a voltmeter connected across the resistor, an ammeter mounted in the front panel of the cabinet connected in series with the resistor, and a plurality of lamps in the cabinet connected in parallel with the resistor and each having a manual switch in series therewith.

Another object is the provision of a tester as in the previous object wherein the resistor is mounted in an opensided housing inset in one end of the cabinet.

Another object is to provide a circuit as in the foregoing objects but including manual switch means for shunting the resistor and lamp leads and connecting the regulator output to the battery and making connections for placing the voltmeter across either the battery or generator output.

Further objects and numerous of the advantages of my invention will become apparent from the following detailed description and annexed drawings, wherein.

Figure 1:
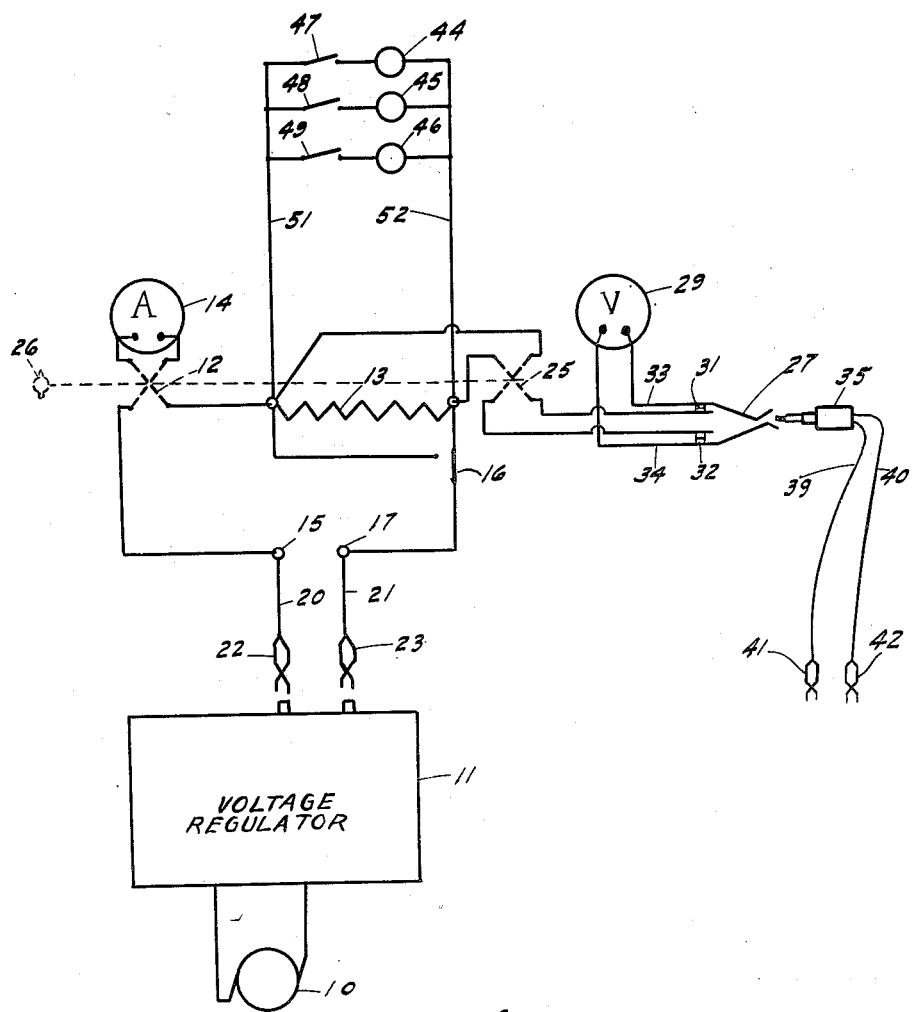
Fig. 1 is a wiring diagram of the tester circuit.

Referring to the drawings, numeral 10 designates an automobile generator across the output of which is automobile voltage regulator 11.

The fixed resistor of 0.75 ohm is shown at 13; its mounting in the tester cabinet will be described presently. One end of resistor 13 is connected through ammeter 14 and reversing switch 12 to a terminal 15. The other end of resistor 13 is connected through manual two point switch 16 to terminal 17. Terminals 15 and 17 have flexible leads 20 and 21 connected thereto which are outside the instrument as will be described and at the ends of these leads are spring clip connectors 22 and 23 for connecting across the output terminals of the voltage regulator. In practice, one of these leads would be connected to ground, one side of the regulator output also being grounded.

Numeral 25 designates a second reversing switch, one pair of terminals of which is connected to the ends of resistor 13. The other pair of terminals of switch 25 is connected through double circuit jack 27 to voltmeter 29. That is, voltmeter 29 is normally connected across resistor 13 through jack 27 and reversing switch 25. Jack 27 is of known construction having two pairs of normally closed contacts 31 and 32 and extending spring arms 33 and 34 cooperable with plug 35 insertable between the arms. When plug 35 is inserted contact pairs 31 and 32 are separated and the voltmeter 29 is connected across the plug-jack circuit, the plug 35 having flexible leads 39 and 40 having spring clip connectors 41 and 42 at their ends for connecting these leads to the terminals of the automobile battery for checking or measuring the battery voltage. The reversing switches 12 and 25 have a common operating knob 26 as shown.

Numerals 44, 45, and 46 designate three similar resistances in the form of lamps, each lamp having in series therewith a single point manual switch, these switches being designated by the numerals 47, 48, and 49. Closing of switches 47, 48, and 49 connects the respective lamps between wires 51 and 52 which connect respectively to the ends of resistor 13. That is, the lamps are connectible in parallel as a load across resistor 13.

Figure 2:
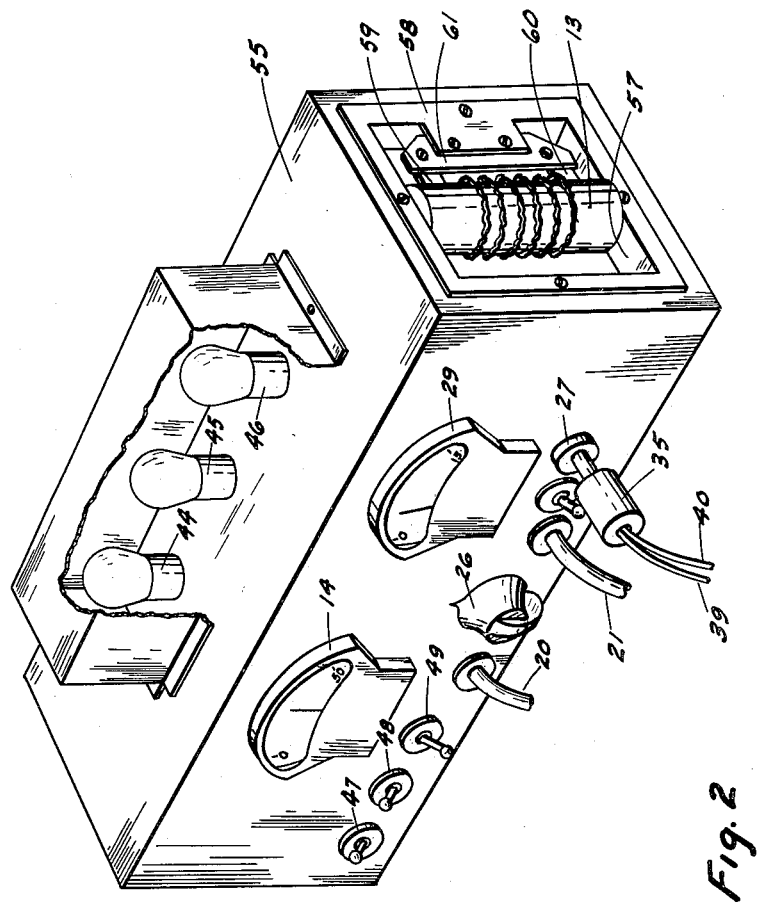
Fig. 2 is a perspective view of the tester cabinet.

Referring to Fig. 2 the tester cabinet which is a relatively small portable casing is shown at 55. The ammeter 14 and voltmeter 29, both of the fan-shaped type are mounted in the front panel of the instrument. The ammeter has a range of from 0 to 50 amperes and the voltmeter has a range of 0 to 15 volts.

Mounted in the top of the main housing of the instrument is a fibre panel and carried by this panel are the three lamps 44, 45, and 46. The operating switches for these lamps are mounted in the front panel of the instrument as shown. The lamps are within a smaller housing or cover attachable to the upper part of the main instrument cabinet.

The common operating handle 26 for the two reversing switches is mounted in the front panel between the ammeter and voltmeter as shown.

Fig. 2 shows the mounting of resistor 13 in the end of the cabinet. Numeral 57 designates an aluminum housing for resistor 13 having a flange all around its edges. Housing 57 is inset in the end of the cabinet and the flange is attached to the cabinet by bolts as shown. Mounting plate 58 forms a bracket carrying insulator strip 61 to which arms 59, and 60 at the ends of resistor 13 are attached. Resistor 13 is thus in an upright position in the tester in the inset in the end of the instrument. Resistor 13 has cooling fins as shown and its mounting provides for adequate cooling by circulation of air over it.

In the operation of the instrument the plug 35 is withdrawn from jack 27; the battery lead is disconnected from the voltage regulator and leads 20 and 21 are clipped across the voltage regulator output. This places resistor 13 directly across the regulator output with ammeter 14 in series and voltmeter 29 across the resistor 13. Thus the operator now knows that he has a known fixed load across the regulator output and no other load. He now checks the voltage reading which should be very nearly 7.5 volts if the regulator is set and operating properly. The ammeter should show a current reading of about 10 amperes as carried by resistor 13. The operator now closes switch 47 placing lamp 44 across resistor 13 and checks the voltage as shown by voltmeter 29. The voltmeter should show a slight movement and settle at a point slightly below 7.5 volts. This indicates that the voltage regulator is regulating properly. The operator also observes the ammeter 14 and there should be an increased amperage. The operator repeats these steps, closing switches 48 and 49. In each case there should be a movement of the voltmeter pointer with the pointer remaining very near 7.5 volts indicating proper regulation by the voltage regulator and in each case there should be a proportionate increase in amperage as indicated by ammeter 14.

It will be observed that the foregoing provides a quick, positive, and convincing test of the regulating ability of the voltage regulator and of the generator current output. The test is independent of any doubtful variables such as battery condition. The test requires a minimum of mental effort on the part of the operator and the time required to make the test is reduced to a minimum since no adjustments are required; only the closing of the manual switches is required and observation of the meters. The test is thoroughly satisfying to the operator in that it demonstrates conclusively the proper operability of the voltage regulator and also the generator.

Figure 3:
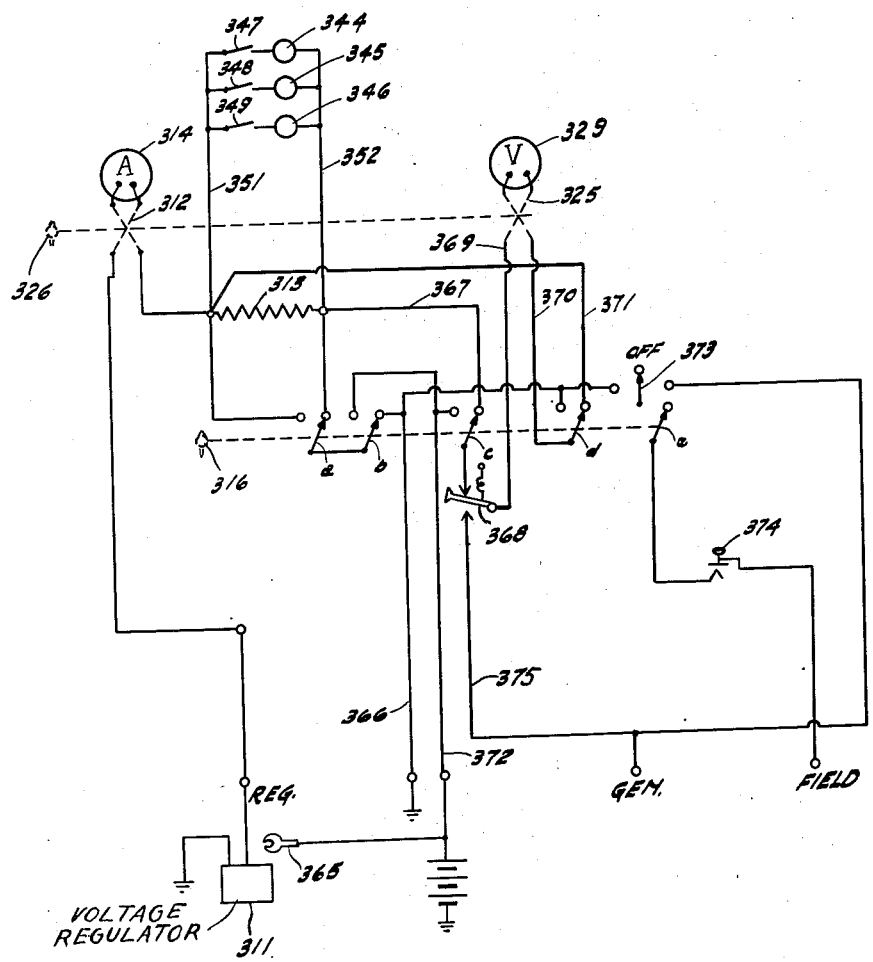
Fig. 3 is a wiring diagram of a modified form of tester circuit.

Fig. 3 shows a second form of my invention wherein the instrument is enlarged in a novel way so as to make certain additional checks or tests.

In Fig. 3 the resistor and lamp loads are the same as in Fig. 1 as are the ammeter, voltmeter and polarity reversing switches. These items are numbered 300 higher than in Fig. 1. The instrument in this form has five flexible leads which attach to the automobile components as indicated namely, the voltage regulator, ground, battery, generator, and generator field. It will be understood of course that one side of the battery is normally grounded and the other side normally is connected to the voltage regulator and this latter connection is broken, as indicated by lead 365 when a test is made with this instrument. This is the only disconnection that need be made with this instrument.

The transfer switch 316 is a five pole, double throw switch as shown, having poles a, b, c, d, and e. When this switch is in its right hand position this will be called its No. 1 position and when it is in its left hand position it will be called its No. 2 position.

With the circuit as shown with transfer switch 316 in its No. 1 position, resistor 313 and the lamp loads (when switches 347, 348, and 349 are closed) are across the voltage regulator 311 as before, the circuit being through poles a and b to ground through wire 366. In this position voltmeter 329 is across resistor 313 through the circuit wire 367, pole c, manual switch 368, wire 369, voltmeter 329, wire 370, pole d and wire 371 back to resistor 313. Manual switch 368 has upper and lower contacts as shown and is biased by a spring as shown to normally engage its upper contact.

When transfer switch 316 is in No. 2 position, resistor 313 and lamp loads 344 to 346 are shunted and the voltage regulator 311 is connected to the battery through poles a, b, and wire 372. The voltmeter is now across the battery through wire 372, pole c, manual switch 368, wire 369, voltmeter 329, wire 370, pole d to ground. Thus the generator charging rate can now be checked.

By depressing manual switch 368, voltmeter 329 is placed across the generator to check its voltage through the circuit including wire 375, switch 368 (lower contact) wire 369, voltmeter 329, wire 370, pole d, to ground. As understood, one side of the generator is normally grounded.

When switch 316 is in No. 2 position, pole e puts a single pole three position switch 373 in circuit for checking the generator with its field directly across the generator armature. (It is normally in series with the voltage regulator.) This provides for a check of maximum generator output and is a convenient way of checking for fan belt slippage or a fault in the field winding itself, etc. Pole e connects to the generator field terminal through a normally open manual depressor switch 374. Switch 373 has a central "off" position and its left contact connects to ground as shown and its right contact connects to the generator terminal. Thus with switch 316 in No. 2 position the generator voltage with the field grounded (directly across the generator) can be checked (switch 373 in left hand position) by depressing switch 368 while switch 374 is normally held closed to complete the connection to the field. Similarly the generator voltage can be checked with the field shorted to the generator by turning switch 373 to its right hand position and depressing switches 368 and 374. Switch 374 can be omitted if desired. The field shorting circuit is provided primarily for Ford cars for the reason that in Fords the generator field is grounded at one end and it is placed directly across the generator armature by shorting it to the generator.

From the foregoing it will be observed by those skilled in the art that the present embodiment of the invention provides a means for making a complete, comprehensive and thorough test of the voltage regulator, battery, and generator in a simple, direct manner. The nature of the instrument is such that any doubts or misgivings as to the tests on the part of the operator are eliminated. The instrument is so arranged that the significance of each connection and instrument reading are made crystal clear to the operator who in each instance knows that no unknown factors are involved in the particular check he is making. Thus a minimum of mental effort and concentration is required of the operator making for quick and easy checks and worrisome studies as to where to make connections and as to the significance of any particular instrument reading are eliminated.

The foregoing disclosure is representative of preferred forms of the invention. Various modifications and alternatives may be adopted by those skilled in the art all of which are intended to fall within the spirit and scope of the claims appended hereto.

I claim:

1. An automobile voltage regulator testing instrument comprising a relatively small portable cabinet having built into it a fixed resistor having leads for connecting it across a voltage regulator output, said cabinet having therein a plurality of lamp loads connected in parallel across said resistor, a manual switch in series with each lamp load having an operating handle mounted on the panel of the cabinet, an ammeter mounted in the cabinet panel normally connected in series with the parallel connected resistor and lamp loads, a voltmeter mounted in the panel of the cabinet normally connected across said resistor, and an additional manual switch mounted in the cabinet panel and connected to disconnect the parallel connected resistor and lamp loads.

2. An automobile voltage regulator testing instrument comprising a relatively small portable cabinet, said cabinet including a housing for a fixed resistor, the housing having an open side and being inset in the end of the cabinet, a fixed resistor mounted in said housing so as to be exposed to the atmosphere for cooling, said cabinet having flexible leads connecting to the ends of said resistor and extending from the cabinet, the leads being adapted for connection across the output of an automobile voltage regulator, said cabinet having there within a plurality of lamp loads connected in parallel across said resistor, a manual switch connected in series with each lamp load and having an operating handle mounted in the panel of the cabinet, an ammeter mounted in the cabinet panel normally connected in series with the parallel connected resistor and lamp loads, a voltmeter mounted in the panel of the cabinet normally connected across said resistor, and an additional manual switch mounted in the cabinet panel and connected to disconnect the parallel connected resistor and lamp loads.

3. An automobile testing instrument comprising a circuit including a fixed resistor having leads for connecting it across a voltage regulator output, a plurality of lamp loads connected in parallel across said resistor, a manual switch in series with each lamp load, an ammeter in series with the resistor and lamp loads, a voltmeter normally connected across said resistor, a manual multiple contact switch and connections including a lead adapted to be connected to an automobile battery terminal whereby movement of said switch from a first to a second position disconnects said parallel resistor and lamp loads and said switch having contacts and connections which in said second position, connect the output from the voltage regulator to the battery and places the voltmeter across the battery.

4. The structure of claim 3 including an additional manually operable switch in the circuit connections movable to a position wherein the voltmeter is placed across the generator output rather than across the battery.

5. An automobile testing instrument including a fixed resistor having leads for connecting it across a voltage regulator output, a plurality of lamp loads connected in parallel across said resistor, a manual switch in series with each lamp load, an ammeter in series with the resistor and lamp loads, a voltmeter normally connected across said resistor, a manual multiple contact switch and connections including a lead adapted to be connected to an automobile battery terminal whereby movement of said multiple contact switch from a first to a second position disconnects said parallel resistor and lamp loads and said multiple contact switch having contacts and connections which in said second position connect the output from the voltage regulator to the battery and places the voltmeter across the battery, manual contacting means and connections including a contact connecting to a generator terminal for placing the voltmeter across the generator output and means including a connection to a generator field winding for connecting the field directly across the generator armature.

PAUL M. SCHAEFER.

REFERENCES CITED

The following references are of record in the file of this patent:

UNITED STATES PATENTS

| Number | Name | Date |
| --- | --- | --- |
| 2,096,131 | Oestermeyer | Oct. 19, 1937 |
| 2,352,499 | Sears | June 27, 1944 |

OTHER REFERENCES

Dyke's Automobile and Gasoline Engine Encyclopedia by Dyke, Goodheart-Willcox Co. publishers, Fifteenth Edition, 1928, pages 403 and 404.